United States Patent
Sykes et al.

(10) Patent No.: US 7,942,249 B2
(45) Date of Patent: May 17, 2011

(54) SYSTEMS AND METHODS FOR CONTROLLING THE STABILITY OF A WATER BRAKE DYNAMOMETER

(75) Inventors: Carey Lorne Sykes, Quieensbury, NY (US); Kearney Hiatt Sagehorn, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 671 days.

(21) Appl. No.: 11/859,202

(22) Filed: Sep. 21, 2007

(65) Prior Publication Data
US 2009/0081019 A1    Mar. 26, 2009

(51) Int. Cl.
*F16D 57/02*    (2006.01)
(52) U.S. Cl. ............ 188/293; 188/296; 73/862.16
(58) Field of Classification Search ........... 188/290, 188/293, 296; 73/862.08, 862.09, 862.12, 73/862.14, 116.05, 116.06, 116.07, 116.08, 73/116.09, 116.1, 116.11, 862, 862.16, 862.37, 862.581

See application file for complete search history.

(56) References Cited

U.S. PATENT DOCUMENTS

| | | | | |
|---|---|---|---|---|
| 2,189,189 A | * | 2/1940 | Bennett | 188/296 |
| 2,634,830 A | * | 4/1953 | Cline | 73/862.14 |
| 3,598,208 A | * | 8/1971 | Bronder | 188/290 |
| 3,761,196 A | | 9/1973 | Weinert | |
| 4,478,090 A | * | 10/1984 | McFarland | 73/862.09 |
| 4,718,286 A | * | 1/1988 | Eller | 73/862.14 |
| 4,899,595 A | * | 2/1990 | Warsaw | 73/862.14 |
| 5,816,665 A | * | 10/1998 | Burnett et al. | 188/293 |

* cited by examiner

*Primary Examiner* — Thomas J Williams
(74) *Attorney, Agent, or Firm* — Sutherland Asbill & Brennan LLP

(57) ABSTRACT

A system for stabilizing a water brake including at least two rotor disks, a chamber of the water brake for containing water positioned between the at least two rotor disks, a pressure measuring device for measuring a partial pressure in the chamber, and an air injection device for injecting air into the chamber to increase the partial pressure in the chamber.

17 Claims, 4 Drawing Sheets

SYSTEMS AND METHODS FOR CONTROLLING THE STABILITY OF A WATER BRAKE DYNAMOMETER

TECHNICAL FIELD

This application relates to water brake dynamometers and more particularly relates to controlling the stability of a water brake dynamometer.

BACKGROUND OF THE INVENTION

Water brake dynamometers (hereinafter "water brake") are commonly used as test devices for providing load to a variety of rotating apparatuses. The water brake commonly includes rotor disks that may be spun by the rotating apparatus to be tested. Water is typically injected into the water brake to provide a load on the rotor disks which ultimately provides a load to the rotating apparatus to be tested. The water in the water brake may cause high frequency pulsations which causes vibration and destabilizes the water brake, resulting in effects including, but not limited to rotating stall, speed and/or torque oscillations, and water brake, rotor train, and structural support vibration Therefore, there is a need in the art for systems and methods for stabilizing the water brake by dampening the high frequency pulsations occurring in water brakes.

BRIEF DESCRIPTION OF THE INVENTION

One exemplary embodiment of the application includes a system for stabilizing a water brake including at least two rotor disks, a chamber of the water brake for containing water positioned between the at least two rotor disks, a dynamic pressure measuring device for measuring a partial pressure in the chamber, and an air injection device for injecting air into the chamber to increase the partial pressure in the chamber.

Another exemplary embodiment of the application includes a method for stabilizing a water brake including injecting water into a number of chambers of the water brake to create a load on a number of rotor disks of the water brake, measuring the partial pressure in the chambers, and injecting air into at least one of the chambers to increase the partial pressure in the at least one of the chambers.

DETAILED DESCRIPTION OF THE INVENTION

The present application relates to systems and methods for stabilizing a water brake during operation. A water brake generally includes a casing, a rotor, a number of rotor disks, and a number of inlet chamber stator disks positioned within the casing. The general configuration of a water brake is known to those of ordinary skill in the art and is not detailed in this application.

During operation of a water brake, water or other fluids are injected into chambers between the inlet chamber stator disks and the rotor disks to create a constant load on the rotor. The rotor disks may be of any configuration including without limitation smooth discs, cup/vain discs, and perforated discs. At even low loads, high frequency pulsations may occur which destabilizes the water brake. The destabililzation often causes vibration in the water brake which causes the entire water brake, rotor train and support structures to vibrate as well as results in torque and speed oscillations.

Supercharged air or any gas may be injected into the chambers to increase the partial pressure within the chambers to prevent, dampen, or remove the high frequency pulsations and/or related rotating stall and to stabilize the water brake. The partial pressure would optimally remain a positive pressure measurement. The positive partial pressure will act as a damper in the water brake and dampen or remove the pulsations. In an exemplary embodiment, the air is injected at an inlet location of the water into the chambers. Generally, as the load is increased on the rotor through an increase in water flow, the flow rate of the air is increased to maintain the positive partial pressure within the water brake.

A control system may be implemented to control the stability of the water brake through modification of the flow rate of the injected air. The control system may monitor the pressure within the chambers and adjust the flow rate of the injected air accordingly to maintain positive partial pressure. In one embodiment, the pressure may be measured in each chamber and the flow rate of the injected air may be modified with respect to each chamber.

The present application now will be described more fully hereinafter with reference to the accompanying drawings, in which exemplary embodiments of the application are shown. This application may, however, be embodied in many different forms and should not be construed as being limited to the embodiments set forth herein; rather, these embodiments are provided so that this disclosure will be thorough and complete, and will convey a scope of the application to those skilled in the art.

Figure 1:
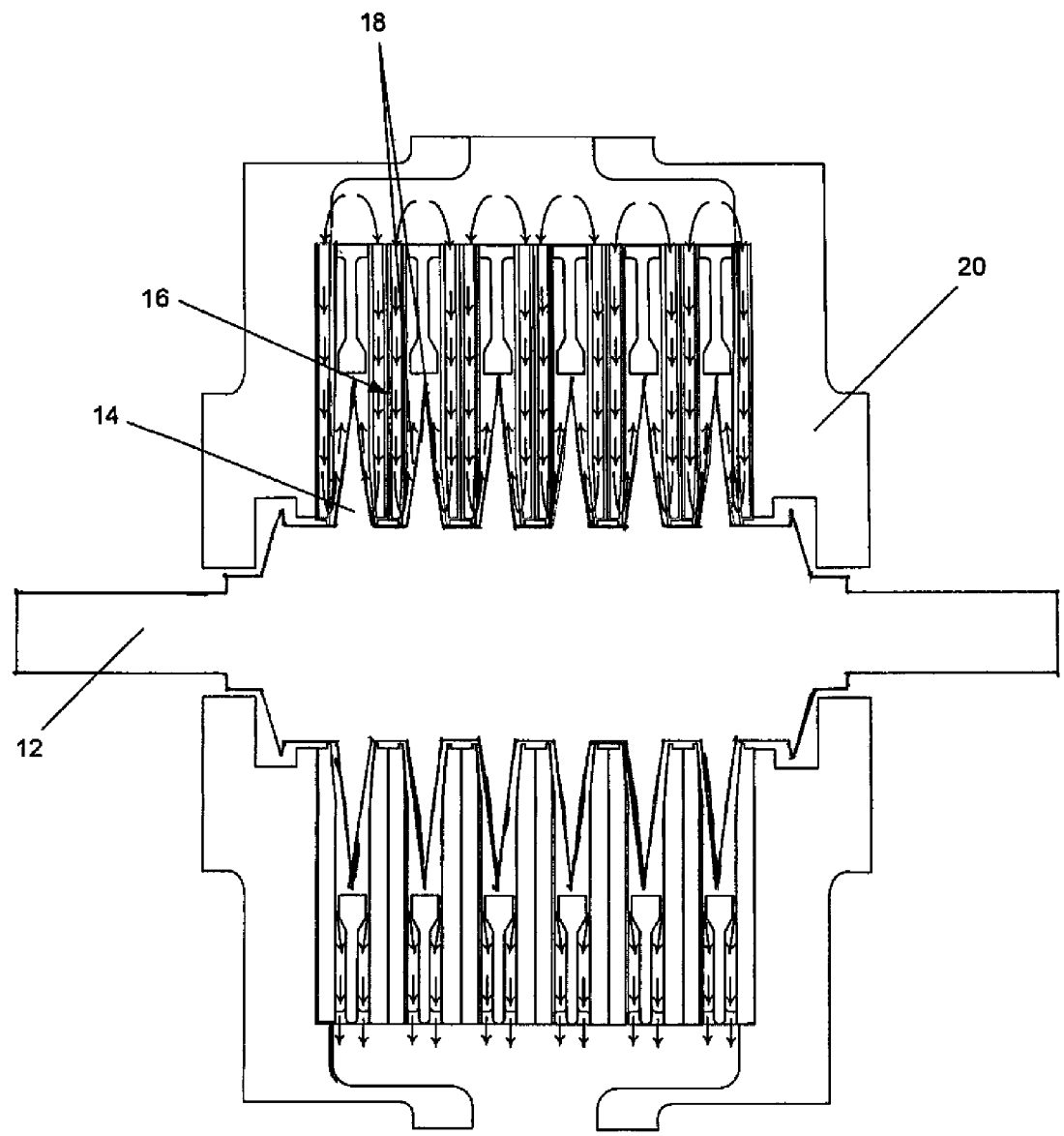
FIG. 1 illustrates a cross-section of a water brake according to an exemplary embodiment of the application.
Figure 2:
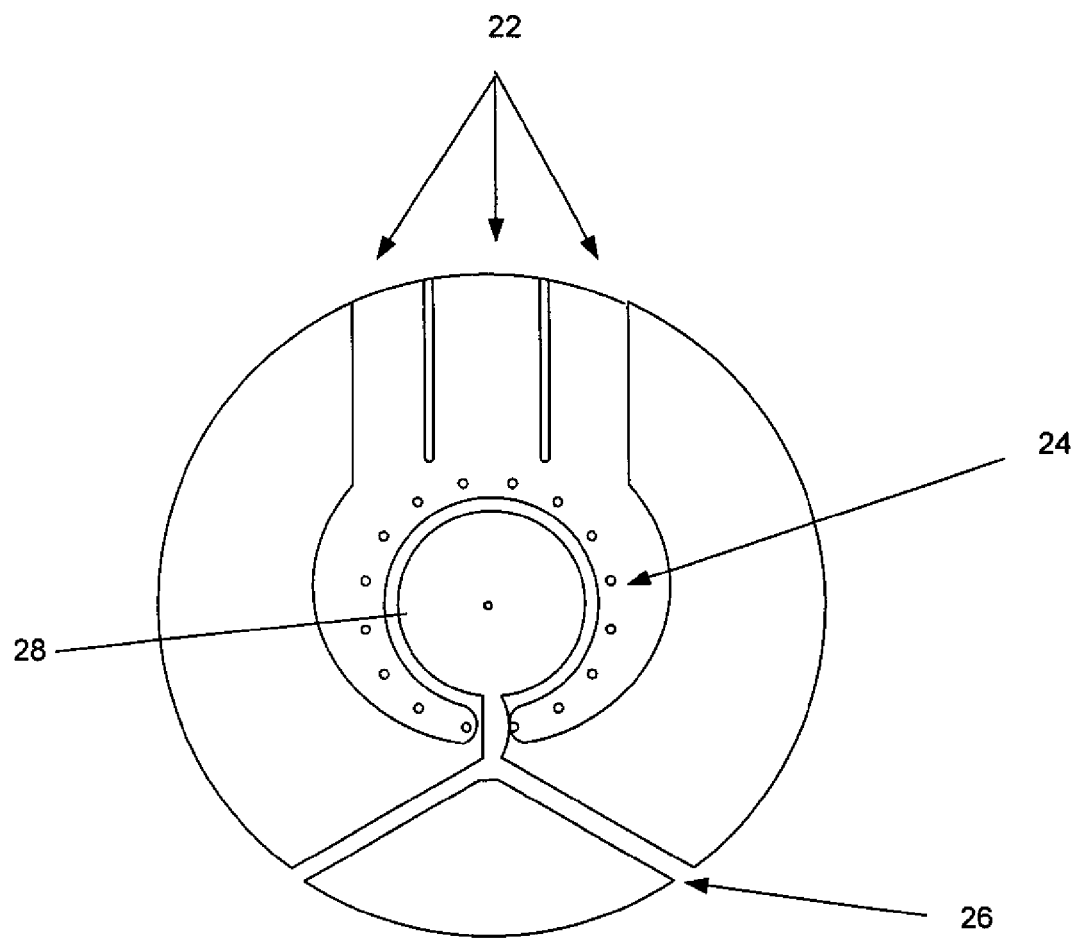
FIG. 2 illustrates a cross-section of a inlet chamber stator disk according to an exemplary embodiment of the application.

FIG. 1 illustrates the cross-section of a water brake according to an exemplary embodiment of the application. As shown in FIG. 1, the water brake may include the rotor 12, a number of rotor disks 14, a number of inlet chamber stator disks 16, a number of chambers 18, and a casing 20. The chambers 18 are formed between the rotor disks 14. The inlet chamber stator disks 16 may be disposed within the chambers 18. Water may be inserted into the chambers 18 through the inlet chamber stator disk 16. FIG. 2 illustrates a cross-section of the inlet chamber stator disk 16 according to an exemplary embodiment of the water brake. The inlet chamber stator disk 16 may include a water inlet 22 and water outlet holes 24. Water may be injected into the water inlet 22 where it travels through the water outlet holes 24. The water outlet holes 24 output the water into the chamber 18 of the water brake.

The inlet chamber stator disk 16 also includes an air inlet channel 26 for injecting pressurize air into the chambers of the water brake. Pressurized air is forced into the air inlet channels 26 and travels to the orifice 28. The orifice 28 has a clearance with respect to the chamber 18 and rotor 12 to permit the pressurized air to travel into the chamber 18. The chamber 18 therefore may include water and pressurized air inserted through the inlet chamber stator disk 16. It should be understood that the inlet chamber stator disk 16 disclosed herein is only an exemplary embodiment and this application is no way limited to this configuration. Any system that permits air to be injected into the chambers to raise the partial pressure in the chambers to prevent or dampen high frequency pulsations is contemplated herein.

Figure 3:
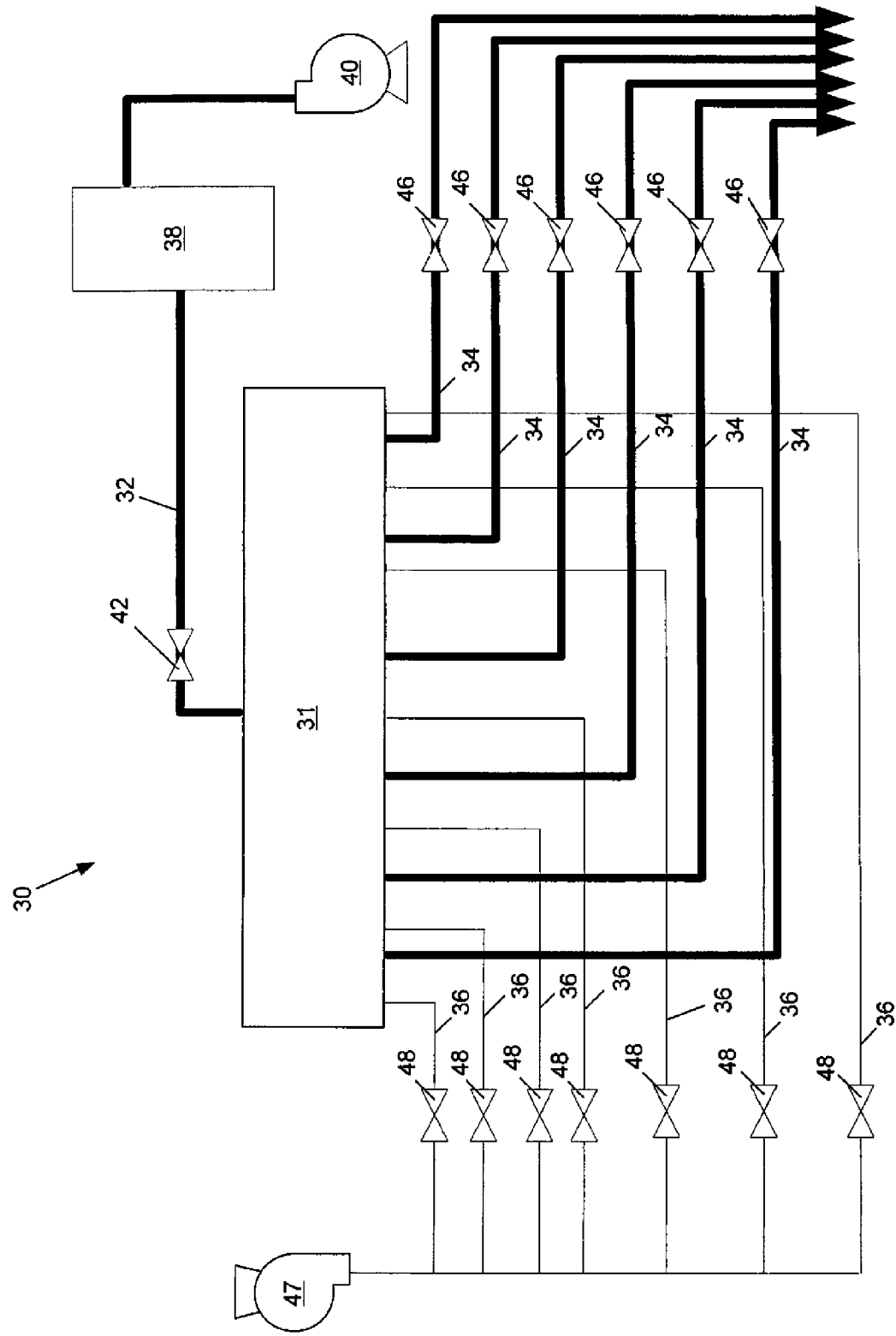
FIG. 3 illustrates a system implementing a programmable logic controller according to an exemplary embodiment of the application.

A Programmable Logic Controller (PLC) control system 30 may be implemented to control the amount of water and flow of supercharged air injected into the water brake. FIG. 3 illustrates an exemplary embodiment of the PLC control system for a water brake 31 having one water inlet port 32, six water outlet ports 34, and seven supercharged air injector ports 36. It should be understood that this application is not limited to the number of water inlet pons, water outlet ports and supercharged air injector ports described in this exemplary embodiment. As shown in FIG. 3, the water is injected into the water brake at water inlet port 32 from water source 38. The water may be injected using a water pump 40 or any other suitable means. A inlet water valve 42 may be used to control the inlet flow of the water. The water is output through water outlet ports 34. Water discharge control valves 46 may be used to control the amount of water discharged from the water brake 39. As is shown, a water discharge control valve 46 may be positioned on each respective water outlet port 34. Supercharged air may be injected into the water brake through air inlet ports 36. The air may be injected through the use of a pump, compressor, or any other suitable means. In the embodiment using a air injector pump 47, the flow of the air may be controlled by the pump. Air inlet control valves 48 may be used to further control the flow of the air into the water brake. The air inlet control valves 48 may be positioned on each respective air injection control port 36 to the water brake 31. As discussed previously and with respect to the embodiments of FIGS. 1 and 2, the supercharged air and the water are injected into chambers 18 about the rotor disks 14.

Figure 4:
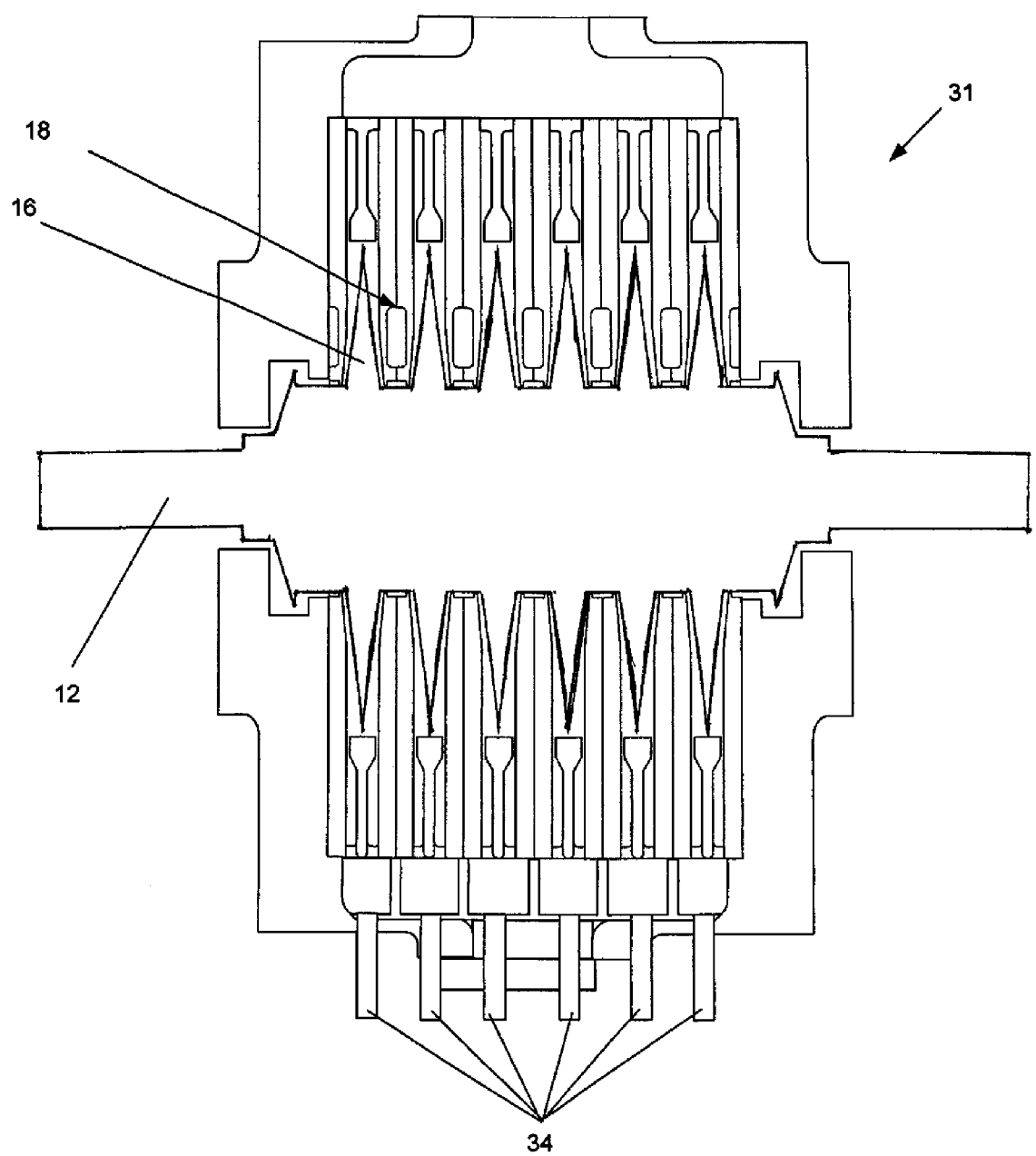
FIG. 4 illustrates a cross-section of a water brake including a number of water outlet ports according to an exemplary embodiment of the application.

The dynamic pressure inside the chambers 18 may be monitored at the water outlet port 34. FIG. 4 illustrates a cross-sectional view of the water brake 31 including water outlet ports 34 according to an exemplary embodiment. The water outlet ports 34 may be configured to associate with a corresponding chamber 18 of the water brake 31. Any suitable pressure measuring device may be used to monitor the dynamic pressure. A pressure measuring device may be positioned about each respective water output port 34 to measure or estimate the dynamic pressure inside the corresponding chamber 18 of the water brake 31. Measurement of the dynamic pressure allows feedback of relative stability or instability with respect to each chamber 18. A control algorithm may be implemented to feed the information back to the PLC controller to adjust the respective air inlet control valve 48 to adjust for the optimum stability of each chamber 18 irrespective of variations in brake load, water flow, or any other variable. Based on the pressure in the respective chambers, the supercharged air may be selectively injected into the respective chambers to increase the partial pressure and to prevent or dampen any high frequency pulsations.

The flowrate of the air injected into the chambers may vary with the load of the water brake, the horsepower of the water brake, the dimensions of the water brake including rotor disk clearances, rotor disk size, rotor disk shape and configuration, chamber size, and other parameters. The logic for determining optimal air flowrate can be adjusted for varying water brake configurations. After determining a suitable model that describes the operation of the water brake, a closed loop control system may be used to automatically control the water input and the air input based on the partial pressure in each chamber of the water brake.

Many modifications and other embodiments of the application will come to mind to one skilled in the art to which this application pertains having the benefit of the teachings presented in the foregoing descriptions and the associated drawings. Therefore, it is to be understood that the application is not to be limited to the specific embodiments disclosed and that modifications and other embodiments are intended to be included within the scope of the appended claims. Although specific terms are employed herein, they are used in generic and descriptive sense only and not for purposes of limitation.

The invention claimed is:

1. A system for stabilizing a water brake having a rotor disk and a chamber containing water positioned about the rotor disk, said system comprising:
   a dynamic pressure measuring device for measuring a dynamic pressure in the chamber;
   an air injection device for injecting air into the chamber; and
   an electronic control system operable to monitor the dynamic pressure in the chamber measured by the dynamic pressure measuring device, and
   based on the dynamic pressure in the chamber, adjust a flow rate of air injected into the chamber by the air injection device, the flow rate of air selected to increase a partial pressure in the chamber to dampen high frequency pulsations within the chamber.

2. The system of claim 1, wherein the water brake comprises a plurality of chambers.

3. The system of claim 2, wherein the air injection device injects air into each of the plurality of chambers.

4. The system of claim 1, further comprising an inlet chamber stator disk disposed within the chamber wherein water may be injected into the chamber through the inlet chamber stator disk.

5. The system of claim 4, wherein the inlet chamber stator disk comprises an air inlet channel for injecting air into the chamber.

6. The system of claim 5, wherein the inlet chamber stator disk comprises an orifice for receiving the air such that the air travels to the chamber through a clearance between the inlet chamber stator disk, rotor and the chamber.

7. The system of claim 1, wherein the electronic control system comprises a programmable logic controller for controlling the amount of water and the amount of air injected into the water brake.

8. The system of claim 1, the water brake comprising a plurality of chambers, the system further comprising a plurality of water outlet ports corresponding to the plurality of chambers.

9. The system of claim 8, further comprising a plurality of dynamic pressure measuring devices positioned in the plurality of water outlet ports such that the plurality of dynamic pressure measuring devices can measure the dynamic pressure in each of the respective plurality of chambers.

10. The system of claim 9, further comprising a plurality of air injector ports positioned in the plurality of chambers, wherein the electronic control system comprises a programmable logic controller and the plurality of air injector ports are controlled by a programmable logic controller to selectively inject air into the plurality of chambers based on the dynamic pressure measured in the plurality of water outlet ports.

11. The system of claim 10, wherein the air is selectively injected into the plurality of chambers using a plurality of air inlet control valves.

12. The system of claim 1, wherein the air injection device comprises a pump.

13. A method for stabilizing a water brake, comprising:
injecting water into a plurality of chambers of the water brake to create a load on a plurality of rotor disks of the water brake;
measuring a dynamic pressure in at least one of the plurality of chambers using a dynamic pressure measuring device;
analyzing the dynamic pressure with an electronic control system to identify a flow rate of air suitable for disrupting high frequency disturbances within the at least one of the plurality of chambers; and
injecting air into the at least one of the plurality of chambers in accordance with the flow rate to increase a partial pressure in the at least one of the plurality of chambers so that the high frequency disturbances are disrupted.

14. The method of claim 13, wherein the electronic control system comprises a programmable logic control for controlling the amount of water and air injected into the plurality of chambers.

15. The method of claim 14, wherein the air is selectively injected into the plurality of chambers based on the dynamic pressure of each of the respective plurality of chambers.

16. The method of claim 15, wherein the air is selectively injected into the plurality of chambers by a pump and a plurality of air inlet control valves.

17. The method of claim 13, wherein the dynamic pressure of each of the chambers is measured at the water outlet port.

\* \* \* \* \*